United States Patent
Zhao et al.

(10) Patent No.: US 9,431,655 B2
(45) Date of Patent: Aug. 30, 2016

(54) ANTIOMONY AND LAYERED CARBON NETWORK BATTERY ANODE

(71) Applicant: Sharp Laboratories of America, Inc., Camas, WA (US)

(72) Inventors: Xin Zhao, Vancouver, WA (US); Sean Vail, Vancouver, WA (US); Yuhao Lu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/795,834

(22) Filed: Jul. 9, 2015

(65) Prior Publication Data

US 2015/0311515 A1    Oct. 29, 2015

Related U.S. Application Data

(63) Continuation-in-part of application No. 14/668,788, filed on Mar. 25, 2015, which is a continuation-in-part of application No. 14/472,228, filed on Aug. 28, 2014, which is a continuation-in-part of application No.

(Continued)

(51) Int. Cl.
*H01M 4/00* (2006.01)
*H01M 4/36* (2006.01)
(Continued)

(52) U.S. Cl.
CPC ........... *H01M 4/366* (2013.01); *H01M 4/0404* (2013.01); *H01M 4/0452* (2013.01);
(Continued)

(58) Field of Classification Search
CPC .. H01M 4/366; H01M 10/052; H01M 4/505; H01M 4/485; H01M 4/525; H01M 4/0404; H01M 2300/0002; H01M 2004/027
USPC ....... 429/213, 221, 223, 224, 231.95, 231.8; 427/122, 600
See application file for complete search history.

(56) References Cited

U.S. PATENT DOCUMENTS

| 4,753,858 A | 6/1988 | Jow |
| 2007/0087268 A1* | 4/2007 | Kim ........ H01M 4/134 429/232 |

(Continued)

FOREIGN PATENT DOCUMENTS

| EP | 0347952 | 12/1989 |
| EP | 2782169 | 9/2014 |

OTHER PUBLICATIONS

D. Larcher et al., Recent Findings and Prospects in the Field of Pure Metals as Negative Electrodes for Li-Ion Batteries, J. Mater. Chem., 2007, 17, 3759-3772.

(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski

(57) ABSTRACT

A method is provided for fabricating an antimony anode. The method disperses antimony (Sb) particles in a layered carbon network using a process such as mechanical mixing, ball milling, stirring, or ultrasound sonication, forming a Sb/carbon composite. The Sb/carbon composite is mixed with a binder, forming a mixture, and the mixture is deposited on a current collector. Advantageously, the binder may be an aqueous (water soluble) binder. In one aspect, prior to dispersing the Sb particles in the layered carbon network, the Sb particles are coated with carbon. For example, the Sb particles may be dispersed in a solution including a polymer, where the solution may be an aqueous or organic. Alternatively, the Sb particles may be dispersed in a solution including a monomer. The monomer solution is polymerized to form polymer sheathed Sb core-shell structures, and then carbonized. Associated Sb anodes and Sb anode batteries are also provided.

19 Claims, 6 Drawing Sheets

Related U.S. Application Data

14/340,141, filed on Jul. 24, 2014, which is a continuation-in-part of application No. 14/320,352, filed on Jun. 30, 2014, which is a continuation-in-part of application No. 14/271,498, filed on May 7, 2014, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
| | |
|---|---|
| H01M 4/60 | (2006.01) |
| H01M 4/505 | (2010.01) |
| H01M 4/485 | (2010.01) |
| H01M 4/525 | (2010.01) |
| H01M 4/04 | (2006.01) |
| H01M 4/133 | (2010.01) |
| H01M 4/136 | (2010.01) |
| H01M 4/137 | (2010.01) |
| H01M 4/1397 | (2010.01) |
| H01M 4/58 | (2010.01) |
| H01M 4/587 | (2010.01) |
| H01M 4/62 | (2006.01) |
| H01M 4/02 | (2006.01) |
| H01M 10/052 | (2010.01) |

(52) U.S. Cl.
CPC .......... *H01M4/0471* (2013.01); *H01M 4/133* (2013.01); *H01M 4/136* (2013.01); *H01M 4/137* (2013.01); *H01M 4/1397* (2013.01); *H01M 4/485* (2013.01); *H01M 4/505* (2013.01); *H01M 4/525* (2013.01); *H01M 4/58* (2013.01); *H01M 4/587* (2013.01); *H01M 4/60* (2013.01); *H01M 4/622* (2013.01); *H01M 4/625* (2013.01); *H01M 10/052* (2013.01); *H01M 2004/027* (2013.01); *H01M 2004/028* (2013.01); *H01M 2300/0002* (2013.01); *H01M 2300/0017* (2013.01); *Y02E 60/122* (2013.01)

(56) References Cited

U.S. PATENT DOCUMENTS

2009/0117467 A1* 5/2009 Zhamu ................ H01M 4/133
429/231.8
2010/0316907 A1* 12/2010 Yamamoto ........... H01M 4/134
429/188

OTHER PUBLICATIONS

M. N. Obrovac and L. Christensen, Structural Changes in Silicon Anodes during Lithium Insertion/Extraction, Electrochem. Solid-State Lett., 2004, 7, A93-A96.

Y. Oumellal et al., The Failure Mechanism of Nano-sized Si-Based Negative Electrodes for Lithium Ion Batteries, J. Mater. Chem., 2011, 21, 6201-6208.

Y. Xu, Y. Zhu, Y. Liu and C. Wang, Adv. Energy Mater., 2013, 3, 128-133.

A. Darwiche et al., Better Cycling Performances of Bulk Sb in Na-Ion Batteries Compared to Li-Ion Systems: An Unexpected . . . , J. Am. Chem. Soc., 2012, 134, 20805-20811.

M. He, K. Kravchyk, M. Walter and M. V. Kovalenko, Monodisperse Antimony Nanocrystals for High-Rate Li-Ion and Na-Ion Battery Anodes, Nano Lett., 2014, 14, 1255-1262.

L. Xiao, et al., High Capacity, Reversible Alloying Reactions in SnSb/C Nanocomposites for Na-Ion Battery Applications, Chem. Commun., 2012, 48, 3321-3323.

L. Ji et al., Controlling SEI Formation on SnSb-Porous Carbon Nanofibers for Improved Na Ion Storage, Adv. Mater., 2014, 26, 2901-2908.

J. Qian et al., High capacity Na-storage and superior cyclability of nanocomposite Sb/C anode for Na-ion batteries, Chem. Commun., 2012, 48, 7070-7072.

Kefei Li et al., Antimony-Carbon-Graphene Fibrous Composite as Freestanding Anode Materials for Sodium-ion Batteries, Electrochimica Acta, 2015.

\* cited by examiner

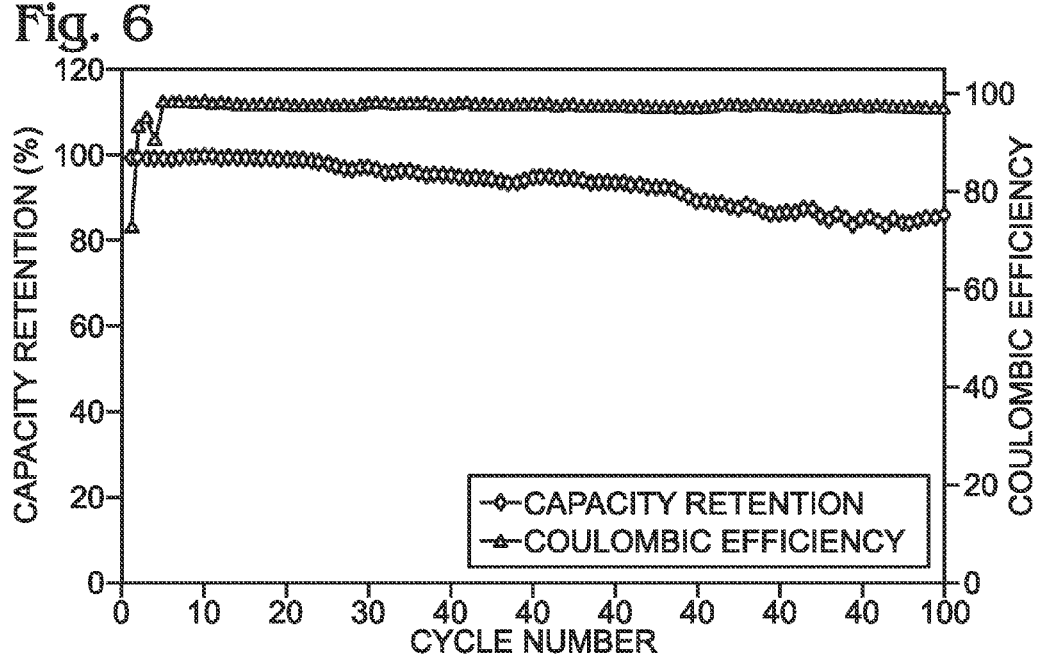
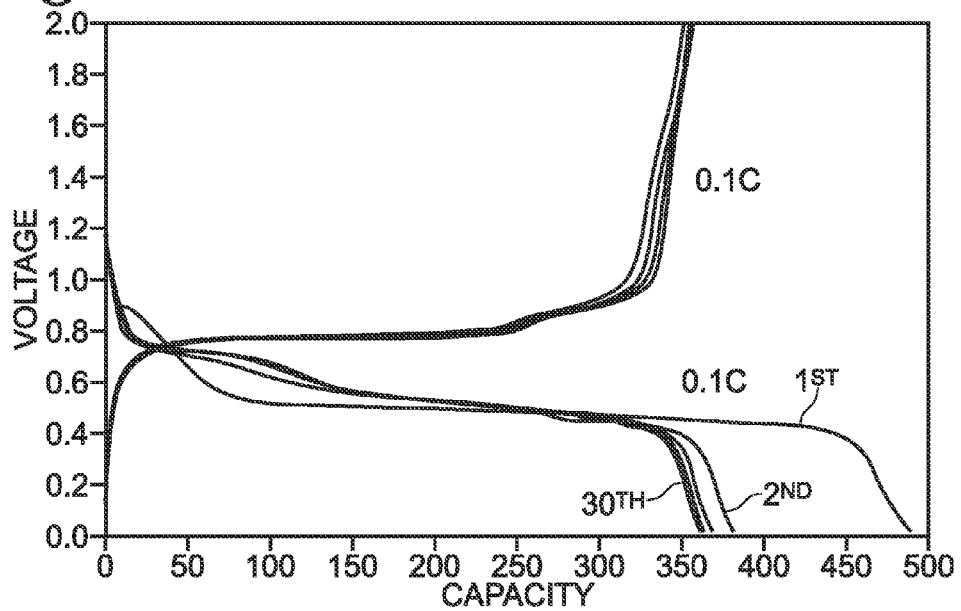

ANTIMONY AND LAYERED CARBON NETWORK BATTERY ANODE

RELATED APPLICATIONS

This application is a Continuation-in-Part of an application entitled, TRANSITION METAL CYANOMETALLATE CATHODE BATTERY WITH METAL PLATING ANODE, invented by Yuhao Lu et al, Ser. No. 14/668,788, filed Mar. 25, 2015;

which is a Continuation-in-Part of an application entitled, METHOD FOR THE SYNTHESIS OF IRON HEXACYANOFERRATE, invented by Sean Vail et al, Ser. No. 14/472,228, filed Aug. 28, 2014;

which is a Continuation-in-Part of an application entitled, TRANSITION METAL HEXACYANOMETALLATE ELECTRODE WITH WATER-SOLUBLE BINDER, invented by Long Wang et al, Ser. No. 14/340,141, filed Jul. 24, 2014;

which is a Continuation-in-Part of an application entitled, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014;

which is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical batteries and, more particularly, to a battery anode comprised of antimony (Sb) particles embedded in a layered carbon network.

2. Description of the Related Art

Concerns over the safety of lithium and sodium batteries has led to the pursuit of rechargeable batteries constituting carbonaceous materials and intercalation compounds as electrodes, in which pure lithium or sodium metal foils or thin films have been replaced by coatings of carbonaceous powders as the negative electrode (anode). Conventional carbonaceous materials e.g., graphite and hard carbon, are constrained by a limited charge-storage capacity and low density, yielding small volumetric energy and power density.

Electrochemically active metals such as silicon, germanium, tin, and antimony can accommodate Li or Na ions via alloying reactions, and thus have been considered as alternative systems for anode applications. The reversible formation of Li and Na alloys offers a much higher theoretical capacity than that of carbonaceous materials, and has demonstrated a great potential to radically boost the energy density of Li-ion and Na-ion batteries. However, during charge/discharge reactions, these metallic anode materials suffer from structural instabilities due to drastic volumetric variation of up to 150-300% upon full lithiation or sodiation. Decomposition of the electrolyte then occurs upon contacting the freshly formed surface of pulverized electrodes, resulting in formation of thick and unstable passivation layers. The kinetics of alloying reactions is further hampered by the passivation reactions. This is accompanied with marked consumption of available Li or Na ions in the battery cells, which leads to unsatisfied capacity retention at high charge/discharge rates and long-term cycling.

In order to mitigate mechanical cracking or fracture of the electrode during cycling, current research efforts are concentrated on reducing the domain of active materials or creating nanostructures, while the potential of such nano-sized or nanostructured materials is largely sacrificed by a reduced tap density and low areal mass loading. The high surface area of such electrode materials is not capable of eliminating the irreversible electrolyte decomposition in the initial cycles. Instead, the first cycle capacity loss is rather intensified when nano-sized metal particles are employed in the anode. Incorporating carbonaceous species offers an alternative solution to suppress the detrimental effects of volumetric change as well as isolation of active metal particles from electrical connection due to surface passivation. Nonetheless, widely used carbon additives such as carbon black, carbon fiber, or ketjen black, with small diameter or porous structures, introduce a large irreversible capacity (low coulombic efficiency, CE). The initial CE of such composite materials is typically less than 70%. In addition, the metal particles are conducive to electrochemical sintering. As the material loading increases, the primary metal particles suffer from a stronger tendency to aggregate and separate from conductive components, leaving the issues of long-term cycling stability and inferior CE unresolved.

It would be advantageous if a metal anode and comprehensive battery cell could be fabricated to be compatible with commercial battery configurations and high-throughput manufacturing protocols, particularly for sodium-ion batteries.

1) T. R. Jow, Rechargeable Sodium Alloy Anode, U.S. Pat. No. 4,753,858.
2) D. Larcher, S. Beattie, M. Morcrette, K. Edström, J.-C. Jumas and J.-M. Tarascon, Recent Findings and Prospects in the Field of Pure Metals as Negative Electrodes for Li-Ion Batteries, *J. Mater. Chem.*, 2007, 17, 3759-3772.
3) M. N. Obrovac and L. Christensen, Structural Changes in Silicon Anodes during Lithium Insertion/Extraction, *Electrochem. Solid-State Lett.*, 2004, 7, A93-A96.
4) Y. Oumellal, N. Delpuech, D. Mazouzi, N. Dupré, J. Gaubicher, P. Moreau, P. Soudan, B. Lestriez and D. Guyomard, The Failure Mechanism of Nano-sized Si-Based Negative Electrodes for Lithium Ion Batteries, *J. Mater. Chem.*, 2011, 21, 6201-6208.
5) Y. Xu, Y. Zhu, Y. Liu and C. Wang, *Adv. Energy Mater.*, 2013, 3, 128-133.
6) A. Darwiche, C. Marino, M. T. Sougrati, B. Fraisse, L. Stievano and L. Monconduit, Better Cycling Performances of Bulk Sb in Na-Ion Batteries Compared to Li-Ion Systems: An Unexpected Electrochemical Mechanism, *J. Am. Chem. Soc.*, 2012, 134, 20805-20811.
7) M. He, K. Kravchyk, M. Walter and M. V. Kovalenko, Monodisperse Antimony Nanocrystals for High-Rate Li-Ion and Na-Ion Battery Anodes, *Nano Lett.*, 2014, 14, 1255-1262.
8) L. Xiao, Y. Cao, J. Xiao, W. Wang, L. Kovarik, Z. Nie and J. Liu, High Capacity, Reversible Alloying Reactions in SnSb/C Nanocomposites for Na-Ion Battery Applications, *Chem. Commun.*, 2012, 48, 3321-3323.
9) L. Ji, M. Gu, Y. Shao, X. Li, M. H. Engelhard, B. W. Arey, W. Wang, Z. Nie, J. Xiao, C. Wang, J.-G. Zhang and J. Liu, Controlling SEI Formation on SnSb-Porous Carbon Nanofibers for Improved Na Ion Storage, *Adv. Mater.*, 2014, 26, 2901-2908.
10) J. Qian, Y. Chen, L. Wu, Y. Cao, X. Ai and H. Yang, High capacity Na-storage and superior cyclability of nanocomposite Sb/C anode for Na-ion batteries, *Chem. Commun.*, 2012, 48, 7070-7072.
11) Kefei Li et al., Antimony-Carbon-Graphene Fibrous Composite as Freestanding Anode Materials for Sodium-ion Batteries, Electrochimica Acta, 2015.

SUMMARY OF THE INVENTION

Disclosed herein is a new form of high-performance intermetallic alloy-based anode constructed from antimony (Sb) and a designed graphitic carbon matrix, as well as methods to fabricate such anode structures. The Sb active material can be either bare Sb particles, or a core-shell structured Sb/carbon composite. The strategy enables the rational design and creation of Sb/graphitic carbon composite anode with enhanced charge-storage capacity, rate capability, and cycling life that can be practically implemented into primary and rechargeable Na-ion batteries. A novel rechargeable (e.g., sodium-ion) battery design is also demonstrated.

The structural design confers a combination of unique aspects and advantageous features as follows. Sb powders are used as active component for anode preparation. The design permits a broad selection of Sb raw materials with various sizes, e.g., from 1 nanometer (nm) to 1 millimeter (mm). Commercial Sb powders or beads can be directly employed as economic Sb sources, offering cost-effective and scalable anode formulations while still achieving excellent electrochemical performance.

The Sb particles are embedded in a conductive carbon matrix composed of graphite or graphene flakes in the form of a layered carbon network. The graphitic flakes provide more effective buffer layers to accommodate the stress from ion (e.g., sodium) insertion/extraction, as compared to rigid carbon particles such as carbon black. Besides, among all carbon materials, graphitic structures form the most stable surface passivation layers when contacting an electrolyte, which benefits the electrode cyclability. The graphitic matrix or layered carbon network also provides highly conductive pathways throughout the electrode, which improves the rate capability of the electrode. The graphitic matrix promotes a high packing density and sustained structural integrity, consolidated by the compact graphitic domains, which enhances the volumetric energy and power density, along with structural stability.

The Sb particles can be further treated by conformal coating of carbon precursors, for instance monomers or polymers, followed by calcinations at elevated temperature. A carbon layer is consequently deposited around the surface of Sb particles, affording a dual carbon protection combined with the graphitic matrix.

Intimate contact of Sb and carbon matrix is generated by mechanical milling of bare or carbon coated Sb with graphite or graphene flakes. The mechanical activation occurring during mixing and agitation induces chemical and intermediate bonds e.g., C—C, C—O and hydrogen bonds, which can function as anchoring sites to adhere the Sb particles and prevent them from re-agglomeration. As a result, a high-performance rechargeable (e.g., sodium-ion) battery design is realized exhibiting excellent power capability, which incorporates a Prussian Blue analogue cathode and the Sb composite anode in a non-aqueous electrolyte.

Accordingly, a method is provided for fabricating an antimony anode. The method disperses antimony particles in a layered carbon network using a process such as mechanical mixing, ball milling, stirring, or ultrasound sonication, forming a Sb/carbon composite. The Sb/carbon composite is mixed with a binder, forming a mixture, and the mixture is deposited on a current collector. Advantageously, the binder may be an aqueous binder (i.e., soluble in water). In one aspect, prior to dispersing the Sb particles in the layered carbon network, the Sb particles are coated with carbon. For example, the Sb particles may be dispersed in a solution including a polymer, where the solution may be aqueous or organic, and then carbonized. Alternatively, the Sb particles may be dispersed in a solution including a monomer. The monomer solution is polymerized to form polymer sheathed Sb core-shell structures, and the polymer shells are then carbonized.

Additional details of the above-described method and an electrochemical battery with an antimony anode are provided below.

BRIEF DESCRIPTION OF THE DRAWINGS

FIG. 6 is a graph showing the anode films being charged/discharged at a constant rate of 1.2 A/g (4 C).

FIGS. 7A and 7B are plots of the charge/discharge capacity versus voltage.

DETAILED DESCRIPTION

Figure 1:
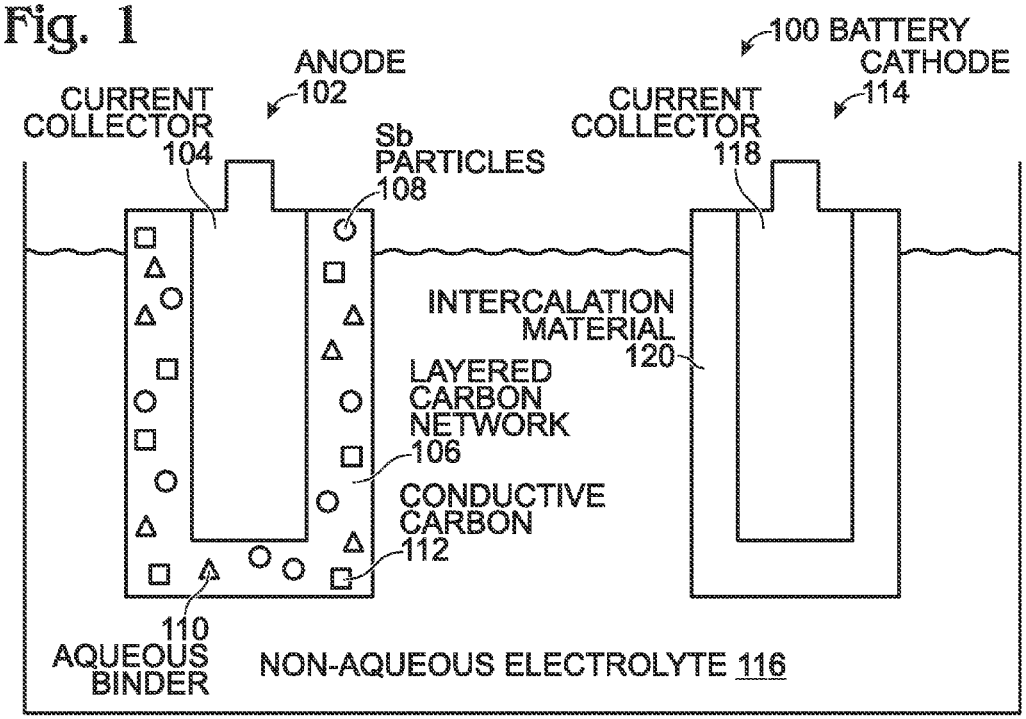
FIG. 1 is a partial cross-sectional view of an electrochemical battery with an antimony anode.

FIG. 1 is a partial cross-sectional view of an electrochemical battery with an antimony anode. The battery 100 comprises an anode 102, which in turn comprises a current collector 104. A layered carbon network 106 overlies the current collector 104, with antimony (Sb) particles 108 embedded in the layered carbon network. Advantageously, the anode 102 may be made with an aqueous binder 110, although non-aqueous materials may also be used. In some aspects, conductive carbon additives 112 may also be included.

To fabricate the Sb anode 102, Sb/carbon composite powders may be mixed with a polymer binder 110, and a conductive additive 112, such as carbon black, carbon nanotubes (CNTs), or carbon nanofibers (CNFs) if necessary. The mixture is deposited onto the current collector 104 by tape casting, spin coating, dip coating, or lamination, etc. The binder 110 typically includes at least one of poly(vinylidene fluoride) (PVDF), copolymers of PVDF e.g. poly(vinylidene fluoride-co-hexa fluoropropylene) (PVDF-HFP), PVC, PVA, polyethylene (PE), polypropylene (PP), ethylene vinyl acetate, and celluloses, e.g. methyl cellulose, carboxymethyl cellulose, ethyl cellulose, butyl cellulose, cellulose acetate, and cellulose nitrate.

Figure 2A:
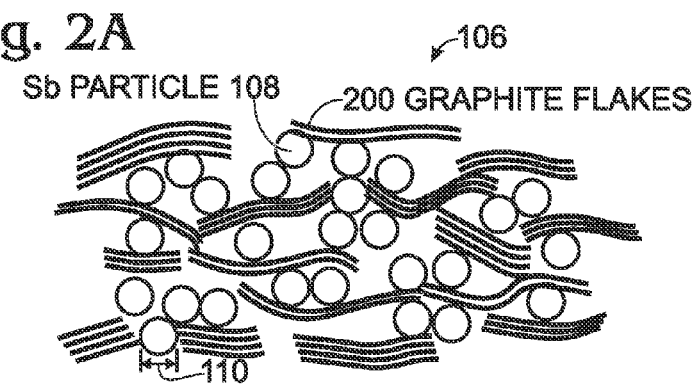
FIGS. 2A through 2D are detailed depictions of the Sb/layered carbon network structures.
Figure 2B:
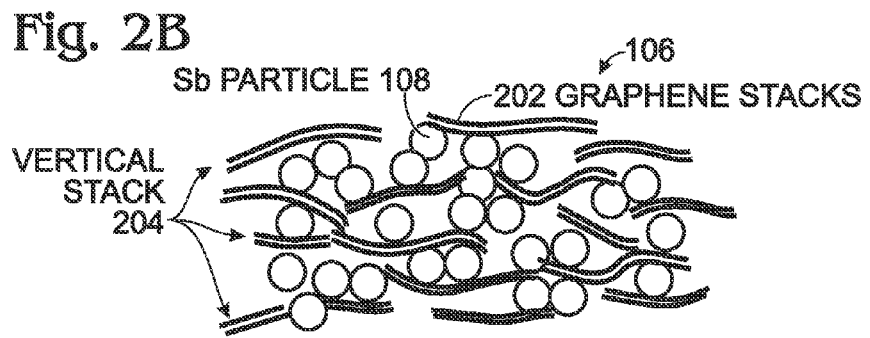
Figure 2C:
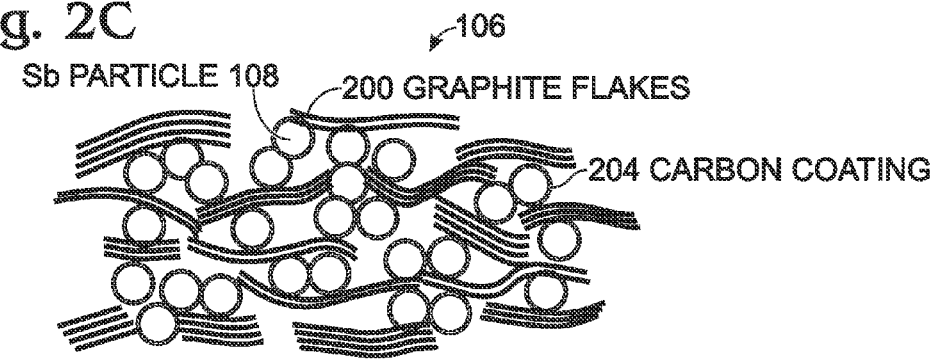

FIGS. 2A through 2D are detailed depictions of the Sb/layered carbon network structures. The layered carbon network 106 of FIG. 1 primarily comprises graphite flakes 200, as shown in FIG. 2A, reconstituted graphene stacks 202, as shown in FIG. 2B, or a combination of the two. As seen in FIG. 2C, a conformal coating of carbon 204 may overlie the Sb particles 108. Although the carbon-coated Sb particles are shown embedded with graphite flakes 200, it should be understood that the Sb particles of FIG. 2B could likewise be coated with carbon.

The carbon coating can be created by dispersing Sb particles in an aqueous or organic, e.g., ethanol, acetone and isopropanol solution containing a polymer e.g. polymethyl methacrylate (PMMA), polyvinyl chloride (PVC), polyethylene oxide (PEO), poly(propylene oxide) (PPO), polyvinylpyrrolidone (PVP), polyvinyl alcohol (PVA), or poly(acrylonitrile) (PAN). The polymer becomes carbon upon heating. Alternatively, the Sb particles are mixed with monomers, e.g., acrylate, ethylene oxide, resorcinol-formaldehyde (RF) gel, or phloroglucinol-formaldehyde (PF) gel followed by in-situ polymerization to form polymer sheathed core-shell structures. The polymer coated Sb particles are then carbonized into carbon encapsulated Sb composites, as shown. The formulation of the carbon coated Sb with graphite flakes or graphene stacks is accomplished by mechanical agitation, as described above.

In general, a "layered carbon network" refers to a planar film-like network constructed from packed and interconnected two-dimensional carbon structures. Graphite is a crystalline form of carbon wherein the carbon atoms are bonded in flat layers (basal planes) with weaker van der Waals interaction holding the layers together. Graphite flakes are ordered graphite with aligned or parallel-oriented basal planes, and a distinctly flaky or platy morphology. As used herein, "basal plane" is the plane perpendicular to the principle (vertical) axis of graphite crystal, and a "van de Waals interaction" refers to the physical attractive or repulsive forces between molecules, particles and surfaces. It is a result from physical polarization of molecules which can be differentiated from chemical bonding.

Figure 2D:
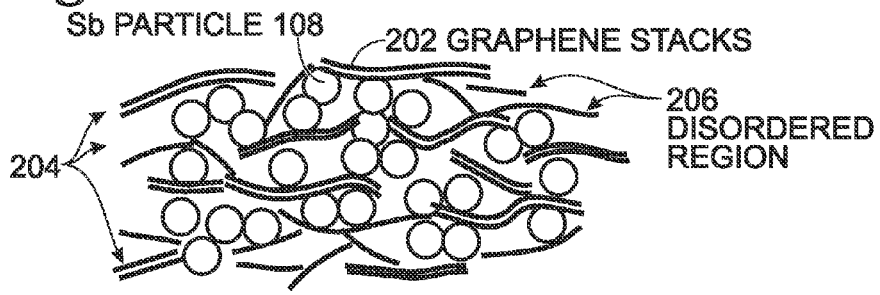

Graphene is a two-dimensional monolayer of graphite. Within the basal plane, the carbon atoms are arranged in a honeycomb crystal lattice comprising polycyclic aromatic rings with covalently bonded carbon atoms having $sp^2$ orbital hybridization. As used herein, "$sp^2$ orbital hybridization" refers to the bonding geometry of carbon atoms within in the basal plane of graphite. Each carbon atom contains three $sp^2$ hybrid orbitals that are attached to three adjacent carbon atoms, arranging in large sheets of bonded carbon atoms. In one aspect, a layered carbon network comprises a plurality of graphene sheets disposed in a vertical stack 204 (FIG. 2B). In another aspect, as shown in FIG. 2D, the layered carbon network comprises both ordered portions of vertical stack 204 of graphene sheets and disordered regions 206 of randomly-oriented graphene sheets. In contrast, with more conventional Sb/carbon composites the majority of the carbon material is amorphous, having a fibrous structure

[11]. As used herein, "reconstituted graphene flakes or reconstituted graphene stacks" refer to an ordered graphene stack consisting of multiple graphene sheets re-assembled during processing. Graphene is monolayer graphite, but it tends to reassemble or re-aggregate, and orient parallel to one another due to the van der Waals forces between them. This reassembly is what is meant by the term "reconstitute". Graphene powders are commercially available, and as-received product is often in the form of such flakes or stacks.

Sb particles are dispersed in graphite flakes or graphene stacks by mechanical mixing, such as ball milling, mechanical blending or stirring, or ultrasound sonication. The graphitic matrix covers graphite flakes, few-layer graphene platelets, and expanded graphite powders etc.

With respect to FIG. 2A, although applicable to FIGS. 2B-2D, the Sb particles 108 have a size 110 in the range of 1 nanometer (nm) to 1 millimeter (mm). The Sb-to-layered carbon network mass ratio is in the range of 1:100 to 100:1. The mass ratio of Sb to graphitic species is typically in the range from about 1/10 to about 10/1.

Returning to FIG. 1, the battery 100 further comprises a cathode 114 and a non-aqueous electrolyte 116. The cathode 114 comprises a current collector 118 and an intercalation material 120 overlying the current collector. The intercalation material 120 is typically a compound having a layered or tunneling structure that can accommodate charges via the insertion of ions (e.g., Na ions). The intercalation material 120 may, for example, be $NaCoO_2$, $NaMnO_2$, $NaNiO_2$, $NaFePO_4$, $MnO_2$, $V_2O_5$, $MoO_3$, Prussian Blue analogues (PBAs), sulfur, active organic materials (e.g., electrically conducting polymers and oxocarbon salts), or combinations thereof.

The PBA material may have the chemical formula $A_m \cdot M1_x M2_y(CN)_6 \cdot z'H_2O$, and have a Prussian Blue hexacyanometallate crystal structure. The "A" symbol represents either alkali or alkaline-earth cations. For example, the A cations may be $Na^+$, $K^+$, $Mg^{2+}$, or $Ca^{2+}$. M1 is a metal having 2+ or 3+ valance positions. M2 is a metal having 2+ or 3+ valance positions. M1 and M2 may, or may not, be the same material. For example, M1 and M2 may be Cu, Fe, Co, Mn, Ni, Cr, Ti, Zn, Sn, or Cd. However, other metal materials may be enabling. The variables are as listed below:

m' is in the range of 0 to 2;
x is in the range of 0.5 to 1.5;
y is in the range of 0.5 to 1.5; and,
z' is in a range of 0 to 10.

The z' variable may include both crystalline water, which can be separated from the PBA material at temperatures greater than 120 degrees C., and interstitial water, which bonds to the A metal and can be removed from the PBA material at temperatures greater than 200 degrees C.

As is conventional, the cathode may also include conductive carbon additives, not shown. In some aspects not shown, an ion-permeable barrier may separate the anode from the cathode. The electrolyte 116 is a non-aqueous solution containing one or a few types of carbonates, e.g., ethylene carbonate (EC), propylene carbonate (PC), dimethyl carbonate (DMC) and diethyl carbonate (DEC) etc., and a sodium salt e.g. $NaPF_6$, $NaClO_4$, NaTFSI, $NaAlO_2$ and $NaBF_4$. Other aqueous binders include poly(acrylic acid) (PAA), carboxymethyl cellulose (CMC), and sodium alginate. Alternatively, the electrolyte can be a gel or solid film, which also acts as a separator (ion-permeable barrier). It consists of a polymer host, e.g., PVDF, PVDF-HFP, PEO, PAN, and PMMA or an ionic liquid e.g. $PYR_{14}FSI$, [BMIM]Cl and [EMIM]Cl, a sodium salt, and an optional plasticizer e.g. inorganic nanoparticles ($SiO_2$, $Al_2O_3$ and MgO etc.), and EC and PC to strengthen the ionic conductivity.

In one example, submicron/micron-sized Sb particles were fabricated by grinding 325-mesh Sb powders using a planetary ball mill. The Sb particles were further milled with expanded graphite powders.

Half-cell charge/discharge tests were done using a CR2032-type coin cell. Metallic sodium was used as the counter electrode. The working electrode was fabricated by first pasting a mixture of Sb/expanded graphite powders, carbon black Super C45 (Timcal), and sodium alginate (MP Biomedicals) binder onto copper foil. The typical mass loading level was about ~2-5 mg per $cm^2$ area of the electrode. The electrode was dried at 120° C. for 12 hours under vacuum before being assembled into a coin cell in an Argon-filled glovebox. The electrolyte solution was 1 M $NaPF_6$/ethylene carbonate (EC)/diethyl carbonate (DEC) (1:1 by volume) (BASF). A microporous glass-fiber membrane (Whatman) was used as the separator.

Figure 3:
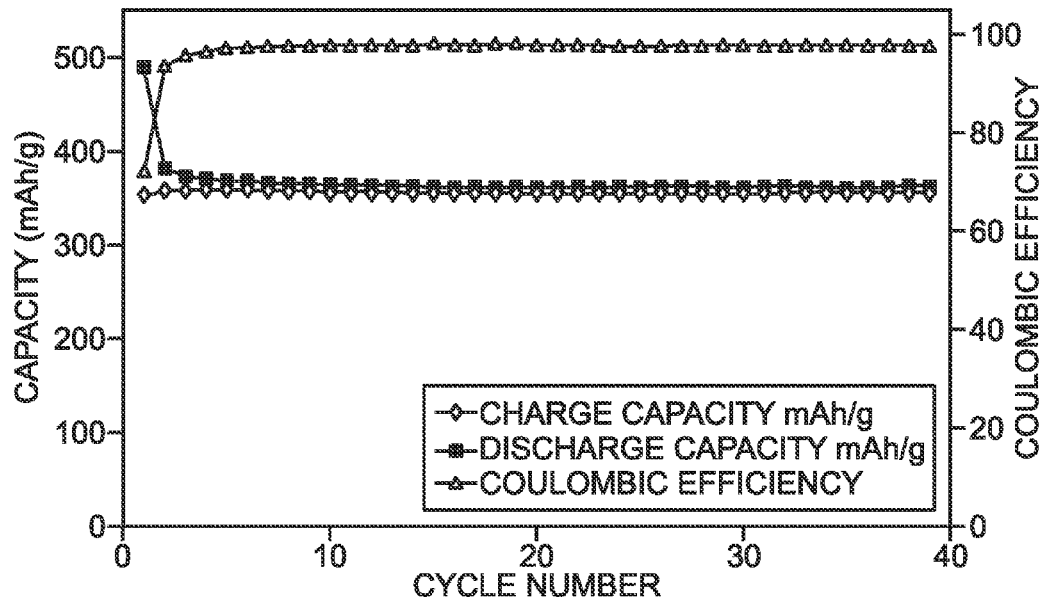
FIG. 3 is a graph depicting the specific capacity and coulombic efficiency of Sb/layered carbon network anode.

FIG. 3 is a graph depicting the specific capacity and coulombic efficiency of Sb/layered carbon network anode. The anode films were charged/discharged at a constant rate of 30 milliamp hours per gram (mAh/g) (0.1 C). With a Sb and expanded graphite mass ratio of 3:2, the composite anode attained a reversible capacity of approximately 370 mAh/g based on the total mass of Sb and expanded graphite, when tested at a constant current density of 0.03 A/g (0.1 C), and remained very stable upon cycling, as shown.

Figure 4:
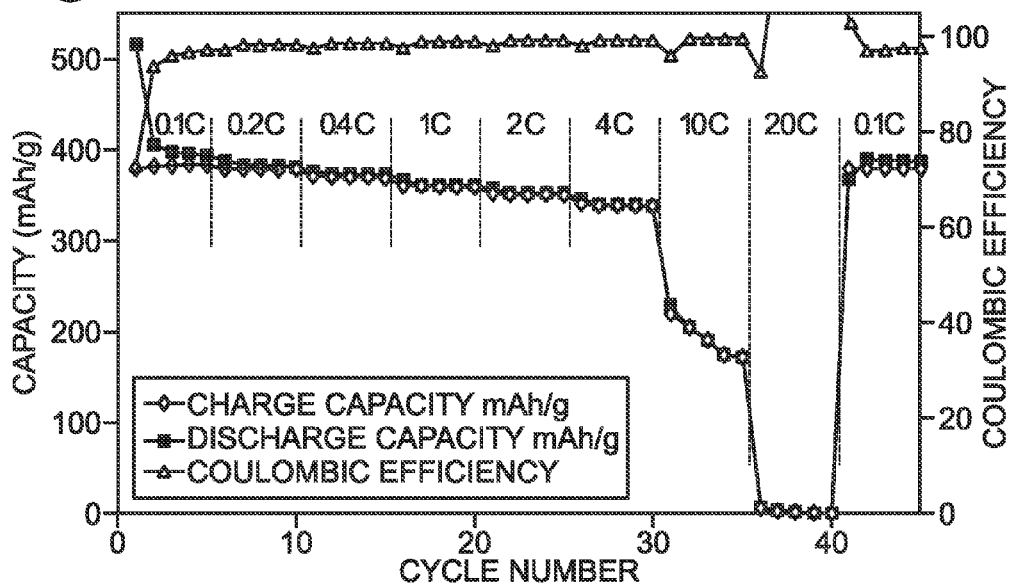
FIG. 4 is a graph depicting the reversible capacity of Sb/carbon composite stabilized at ~355 and ~200 mAh/g when increasing the rate from 0.03 A/g to 0.3 A/g (1 C) and 3 A/g (10 C).

FIG. 4 is a graph depicting the reversible capacity of Sb/carbon composite stabilized at ~355 and ~200 mAh/g when increasing the rate from 0.03 A/g to 0.3 A/g (1 C) and 3 A/g (10 C). The anode films were charged/discharged at 30 mA/g (5 cycles)→60 mA/g (5 cycles)→120 mA/g (5 cycles)→300 mA/g (5 cycles)→600 mA/g (5 cycles)→1200 mA/g (5 cycles)→3000 mA/g (5 cycles)→6000 mA/g (5 cycles).

Figure 5:
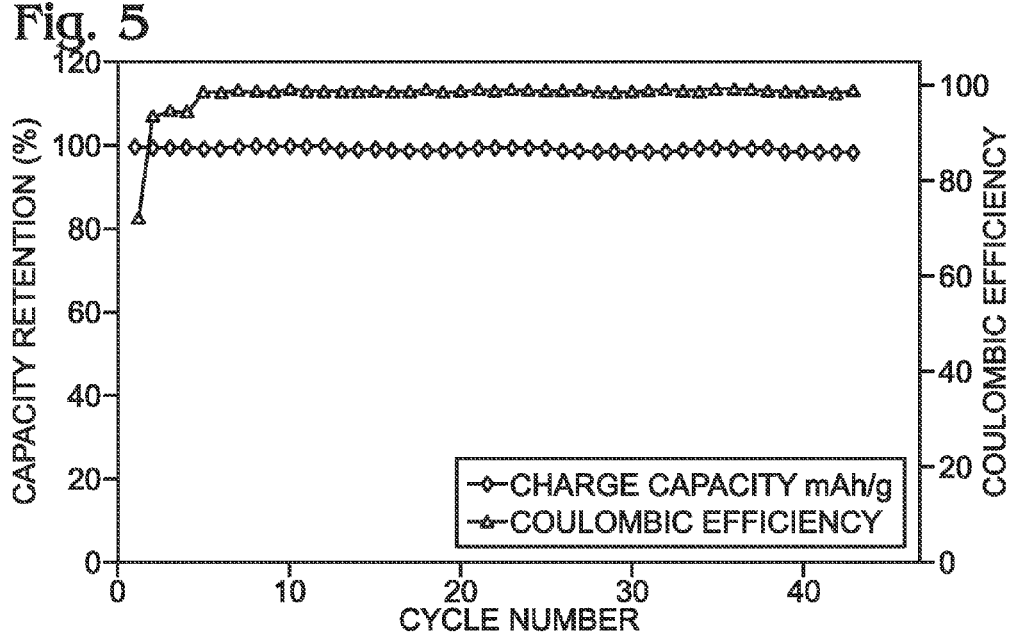
FIG. 5 is a graph showing that there was no decay in the capacity of the exemplary material during the first 50 cycles when tested at a constant rate of 0.3 A/g (1 C).

FIG. 5 is a graph showing that there was no decay in the capacity of the exemplary material during the first 50 cycles when tested at a constant rate of 0.3 A/g (1 C).

FIG. 6 is a graph showing the anode films being charged/discharged at a constant rate of 1.2 A/g (4 C). At a constant rate of 1.2 A/g (4 C), the capacity was ~350 mAh/g, and a single charge/discharge cycle took only 15 minutes.

Figure 7B:
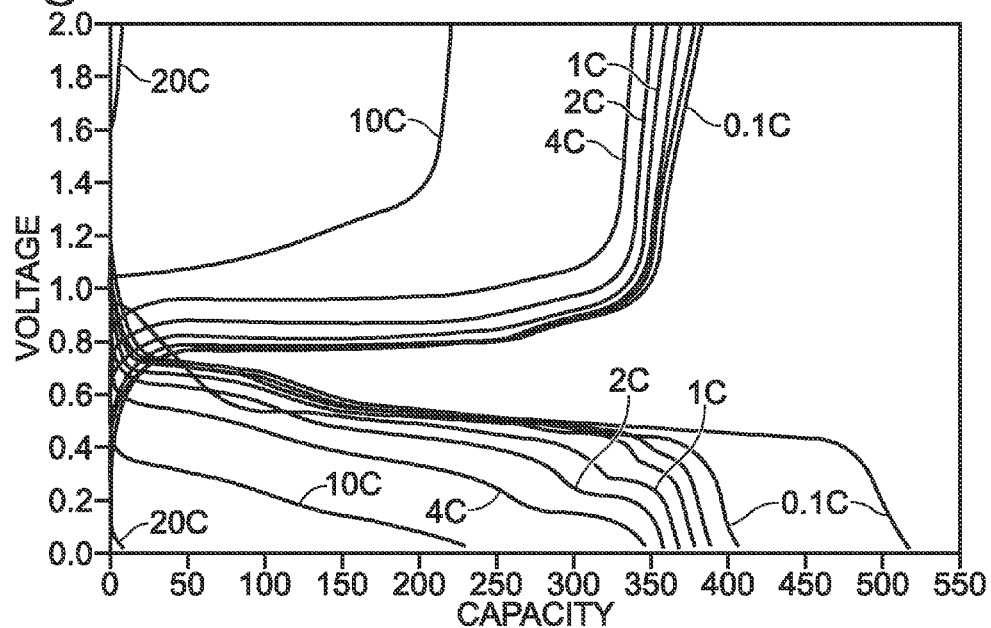

FIGS. 7A and 7B are plots of the charge/discharge capacity versus voltage. In FIG. 7A the anode films were charged/discharged at a constant rate of 30 mAh/g. In FIG. 7B the anode films were charged/discharged at 30 mA/g (5 cycles)→60 mA/g (5 cycles)→120 mA/g (5 cycles)→300 mA/g (5 cycles)→600 mA/g (5 cycles)→1200 mA/g (5 cycles)→3000 mA/g (5 cycles)→6000 mA/g (5 cycles). The charge voltage of Sb composite anode was typically 0.8 V, and the nice plateau regime corresponded to the transformation between amorphous Sb and Na—Sb alloys. 70-88% of initial capacity was retained after 100 cycles, depending on the choice of graphite.

To assemble a full cell, a polypropylene separator was placed on the anode, and a cathode of Prussian Blue analogue was stacked on top. The full cell was sealed inside an aluminum laminated pouch with metal current collectors extending out. The electrolyte solution containing 1 M $NaPF_6$/ethylene carbonate (EC)/dimethyl carbonate (DMC) (1:1 by volume) was injected into the pouch before sealing.

Figure 8:
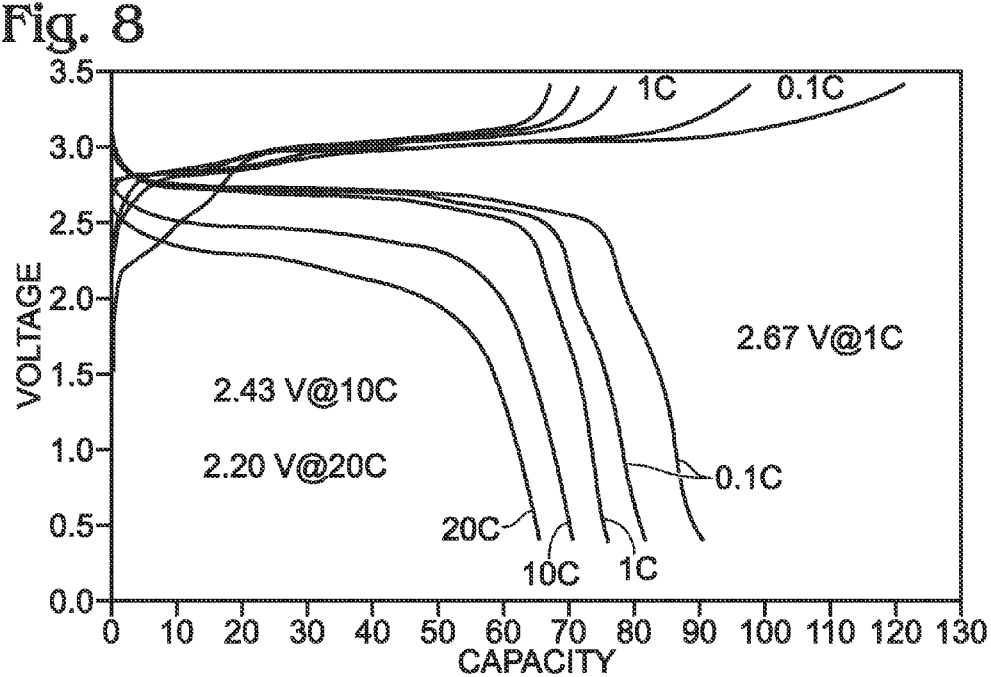
FIG. 8 is a plot of charge/discharge curves of a full cell coupling a Prussian Blue analogue cathode and a Sb/layered carbon network anode.

FIG. 8 is a plot of charge/discharge curves of a full cell coupling a Prussian Blue analogue cathode and a Sb/layered carbon network anode. The cell was charged at 0.1 C for the first 3 cycles, and then at 1 C for the following cycles. The discharge protocol was 0.1 C (3 cycles)→1 C (3 cycles)→10 C (3 cycles)→20 C (3 cycles). When cycled between 0.4 and 3.4 V at a constant rate of 1 C, the cell reversibly charged and discharged with stable capacity retention close to its designed cell capacity. At 1 C discharge rate, a potential plateau at around 2.7 V was seen, as shown. At a very high discharge rate of 20 C, the cell maintained over 70% of its initial capacity at 0.1 C, while the drop of discharge voltage was as small as 0.47 V.

The graphitic carbon matrix (layered carbon network) functions as effective protective layers for Sb particles, which improves anode stability. The graphitic carbon matrix provides highly conductive pathways for charge transfer, leading to high rate capability. The graphitic carbon matrix provides high packing density and sustained structural integrity, yielding high volumetric energy and power density sustainably, and outperforming other reported Sb anodes. The preparation methods generate intimate contact between Sb particles and graphitic layers, which further stabilize Sb particles. A novel high-performance rechargeable sodium-ion battery was thus realized incorporating such a Sb composite anode with a Prussian Blue analogue cathode, in a non-aqueous electrolyte consisting of a sodium salt dissolved in non-aqueous medium.

Figure 9:
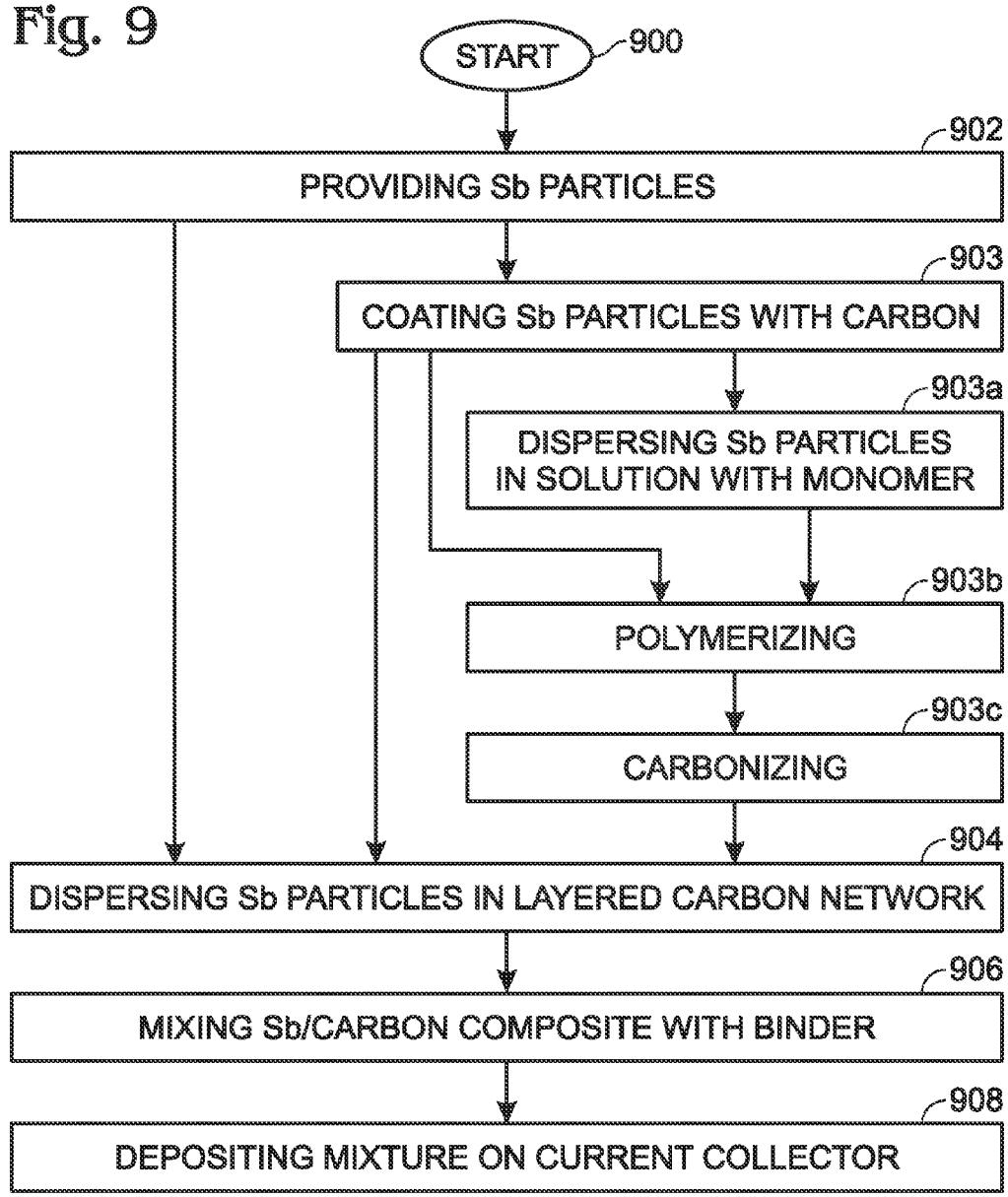
FIG. 9 is a flowchart illustrating a method for fabricating an antimony anode.

FIG. 9 is a flowchart illustrating a method for fabricating an antimony anode. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 900.

Step 902 provides Sb particles. Typically, the Sb particles have a size in the range of 1 nm to 1 mm. Step 904 disperses the Sb particles in a layered carbon network using a process such as mechanical mixing, ball milling, stirring, or ultrasound sonication, forming a Sb/carbon composite. As described above, the Sb/carbon composite is a layered carbon network with embedded Sb particles, where the layered carbon network primarily comprises graphite flakes, reconstituted graphene stacks, or a combination of the two. Typically, the Sb particle-to-layered carbon network mass is a ratio in the range of 1:100 to 100:1. Step 906 mixes the Sb/carbon composite with a binder, forming a mixture. In one aspect, Step 906 adds an aqueous binder to the mixture. Step 908 deposits the mixture on a current collector.

In one aspect, prior to dispersing the Sb particles in the layered carbon network in Step 904, Step 903 coats the Sb particles with carbon. Step 903b may be enabled by dispersing the Sb particles in a solution including a polymer, where the solution consisting of aqueous solvents, organic solvents, or a combination of both. Step 903c carbonizes the polymer. Alternatively, Step 903 is performed using the following substeps. Step 903a disperses the Sb particles in a solution including a monomer. Step 903b polymerizes the monomer solution to form polymer sheathed Sb core-shell structures. Step 903c carbonizes the polymer shells.

A Sb/layered carbon network anode, an associated battery, and an anode fabrication method have been provided. Examples of particular materials and process details have been presented to illustrate the invention. However, the invention is not limited to merely these examples. Although sodium-ions were presented in many of the examples, it should be understood that the invention is applicable to other alkali and alkaline earth metal Prussian Blue analogue cathode materials. Other variations and embodiments of the invention will occur to those skilled in the art.

We claim:

1. An anode in a sodium-ion electrochemical battery, the anode comprising:
   a current collector;
   a layered carbon network overlying the current collector, where the layered carbon network is a material selected from a group consisting of graphite flakes or reconstituted graphene stacks;
   antimony (Sb) particles embedded in the layered carbon network; and,
   a conformal coating of carbon overlying the Sb particles, forming core-shell structures.

2. The anode of claim 1 wherein the Sb particles have a size in a range of 1 nanometer (nm) to 1 millimeter (mm).

3. The anode of claim 1 wherein the Sb-to-layered carbon network mass ratio is in a range of 1:100 to 100:1.

4. The anode of claim 1 further comprising:
   an aqueous binder.

5. A sodium-ion electrochemical battery with an antimony anode, the battery comprising:
   an anode comprising:
      a current collector;
      a layered carbon network overlying the current collector; where the layered carbon network is a material selected from a group consisting of graphite flakes or reconstituted graphene stacks;
      antimony (Sb) particles embedded in the layered carbon network;
   a cathode; and,
   a non-aqueous electrolyte containing a sodium salt.

6. The battery of claim 5 wherein the layered carbon network is a material selected from a group consisting of graphite flakes or reconstituted graphene stacks.

7. The battery of claim 5 further comprising:
   a conformal coating of carbon overlying the Sb particles.

8. The battery of claim 5 wherein the Sb particles have a size in a range of 1 nanometer (nm) to 1 millimeter (mm).

9. The battery of claim 5 wherein the Sb-to-layered carbon network mass ratio is in a range of 1:100 to 100:1.

10. The battery of claim 5 wherein the cathode includes:
    a current collector; and,
    an intercalation material overlying the current collector, comprising a material selected from a group consisting of $NaCoO_2$, $NaMnO_2$, $NaNiO_2$, $NaFePO_4$, $MnO_2$, $V_2O_5$, $MoO_3$, Prussian Blue analogues, sulfur, active organic materials, and combinations thereof.

11. The battery of claim 5 wherein the anode further comprises:
    an aqueous binder.

12. A method for fabricating a sodium-ion electrochemical battery antimony anode, the method comprising:
    providing antimony (Sb) particles;
    coating the Sb particles with carbon, forming core-shell structures;
    dispersing the core-shell structure Sb particles in a layered carbon network using a process selected from a group consisting of mechanical mixing, ball milling, stirring, or ultrasound sonication, forming a Sb/carbon composite, where the layered carbon network is a material selected from a group consisting of graphite flakes or reconstituted graphene stacks;
    mixing the Sb/carbon composite with a binder, forming a mixture; and,
    depositing the mixture on a current collector.

13. The method of claim 12 wherein coating the Sb particles with carbon includes:
    dispersing the Sb particles in a solution including a polymer; and,
    carbonizing the polymer.

14. The method of claim 13 wherein dispersing the core-shell structure Sb particles in the layered carbon network includes using a solution selected from a group consisting of aqueous and organic solvents.

15. The method of claim 12 wherein coating the Sb particles with carbon includes:
dispersing the Sb particles in a solution including a monomer;
polymerizing the monomer solution to form polymer sheathed Sb core-shell structures; and,
carbonizing the polymer shells.

16. The method of claim 12 wherein providing the Sb particles includes providing Sb particles having a size in a range of 1 nanometer (nm) to 1 millimeter (mm).

17. The method of claim 12 wherein dispersing the core-shell structure Sb particles in the layered carbon network includes the Sb particle-to-layered carbon network mass being in a ratio in a range of 1:100 to 100:1.

18. The method of claim 12 wherein mixing the Sb/carbon composite with the binder includes mixing with an aqueous binder.

19. A method for fabricating an antimony anode, the method comprising:
providing antimony (Sb) particles;
coating the Sb particles with carbon as follows:
dispersing the Sb particles in a solution including a monomer;
polymerizing the monomer solution to form polymer sheathed Sb core-shell structures;
carbonizing the polymer shells;
dispersing the Sb particles in a layered carbon network using a process selected from a group consisting of mechanical mixing, ball milling, stirring, or ultrasound sonication, forming a Sb/carbon composite; where the layered carbon network is a material selected from a group consisting of graphite flakes or reconstituted graphene stacks;
mixing the Sb/carbon composite with a binder, forming a mixture; and,
depositing the mixture on a current collector.

* * * * *